United States Patent
Moreno

(10) Patent No.: US 9,901,937 B1
(45) Date of Patent: Feb. 27, 2018

(54) DESILTER

(71) Applicant: Giuseppi Sinnato Moreno, Orlando, FL (US)

(72) Inventor: Giuseppi Sinnato Moreno, Orlando, FL (US)

( * ) Notice: Subject to any disclaimer, the term of this patent is extended or adjusted under 35 U.S.C. 154(b) by 0 days.

(21) Appl. No.: 15/815,950

(22) Filed: Nov. 17, 2017

(51) Int. Cl.
  *B04C 9/00* (2006.01)
  *B04C 5/13* (2006.01)
  *B04C 5/28* (2006.01)
  *E21B 21/06* (2006.01)
  *B01D 21/26* (2006.01)

(52) U.S. Cl.
  CPC ............ *B04C 9/00* (2013.01); *B01D 21/267* (2013.01); *B04C 5/13* (2013.01); *B04C 5/28* (2013.01); *E21B 21/065* (2013.01); *B01D 2221/04* (2013.01)

(58) Field of Classification Search
  CPC .... B04C 9/00; B04C 5/13; B04C 5/28; E21B 21/065; B01D 21/267; B01D 2221/04
  See application file for complete search history.

(56) References Cited

U.S. PATENT DOCUMENTS

| 4,226,726 A | 10/1980 | Rehm |
| 4,571,296 A | 2/1986 | Lott |
| 4,655,923 A | 4/1987 | Leone |
| 9,399,227 B2 * | 7/2016 | Baudoin ............... E21B 21/065 |

* cited by examiner

*Primary Examiner* — David A Reifsnyder
(74) *Attorney, Agent, or Firm* — Ruben Alcoba, Esq.

(57) ABSTRACT

An improved desilter for a mud circulating system. The desilter comprises of a linear manifold that defines an inlet, the linear manifold defines a plurality of symmetrical outlets that run from the inlet of the linear manifold toward a capped end of the linear manifold. A plurality of hydrocyclones that have an upper and lower part that are attached to the symmetrical outlets of the linear manifold. A rectangular looping manifold that is placed above the linear manifold and that is secured to the linear manifold via a pair of supports. The rectangular looping manifold defines a plurality of inlet openings that attach to upper part of each hydrocyclone and an outlet from which fine mud can flow out off. The improved desilter is secured to a mud circulating system via a pair of linear manifold supports that are attached to the mud circulation system.

4 Claims, 4 Drawing Sheets

DESILTER

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The present invention is directed to an improved desilter for drilling muds that uses a combination of hydrocyclones to separate fine particles, or silt, from drilling fluid/mud to lower the amount of solids in the fluid/mud.

Present desilters use hydrocyclones to remove fine particles in the range from 44 microns to 25 microns from drilling mud. The present invention will increase the range to 44 microns to 5 microns, thereby increasing the usefulness of the drilling mud before it becomes liquid waste.

The present invention uses a plurality of symmetrical hydrocyclones that are placed in series along a mud receiving manifold that receives pressurized slurry after it has passed a desander in a mud circulating system used in gas or oil drilling.

The present invention reduces the cost of running a mud circulating system for it increases the usefulness of the drilling mud prior to it being discarded as liquid waste.

SUMMARY

The present invention is an improved desilter that is used to increase the usefulness of mud used on oil or gas drilling mud circulating systems.

The present invention is an improved desilter that comprises of a linear manifold that defines an inlet, the linear manifold defines a plurality of symmetrical outlets that run from the inlet of the linear manifold toward a capped end of the linear manifold. A plurality of hydrocyclones that have an upper and lower part are attached to the symmetrical outlets of the linear manifold. A rectangular looping manifold that is placed above the linear manifold and that is secured to the linear manifold via a pair of supports. The rectangular looping manifold defines a plurality of inlet openings that attach to upper part of each hydrocyclone. The rectangular looping manifold also defines an outlet from which fine mud can flow out off.

The present invention is secured to a mud circulating system via a pair of linear manifold supports that are attached to the mud circulation system.

The manner in which a mud circulating system operates and wherein the present invention is typically is placed is shown at https://www.osha.gov/SLTC/etools/oilandgas/drilling/mud_system.html: the US Department of Labor provides a schematic of a mud circulating system.

The prior art describes in detail the need of minimizing mud particles in U.S. Pat. No. 4,226,726 issued to Rehm on Oct. 7, 1980. The present invention is an improvement over the Rehm reference.

An object of the present invention is to provide a desilter that will increase the usefulness of mud prior to the mud being discarded as liquid waste.

Another object of the present invention is to minimize liquid waste by extending the time that mud can be used in a gas or an oil drilling operation.

Yet another object of the present invention is to reduce costs associated with the preparation and maintenance of mud used in the gas or oil drilling industries.

DRAWINGS

These and other features, aspects, and advantages of the present invention will become better understood with regards to the following description, appended claims, and drawings where:

DESCRIPTION

Figure 1:
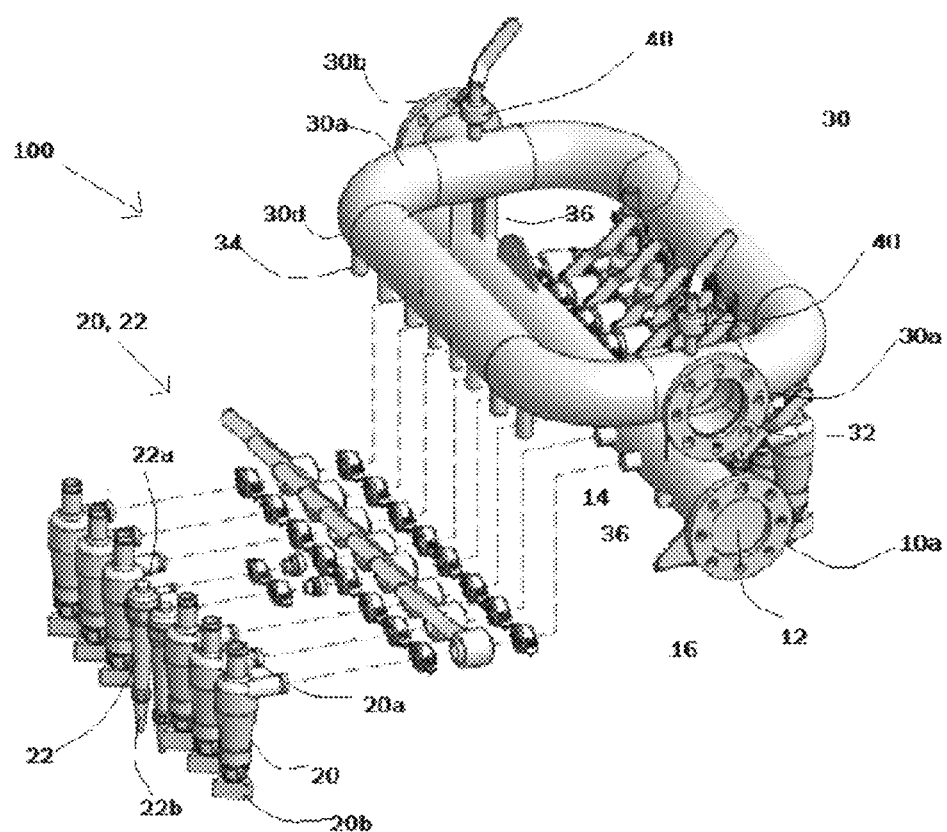
FIG. 1 is a perspective view of the desilter of the present invention that shows how the hydrocyclones attach to the linear manifold and also the manner in which the rectangular looping manifold is placed over and attached to the linear manifold.
Figure 2:
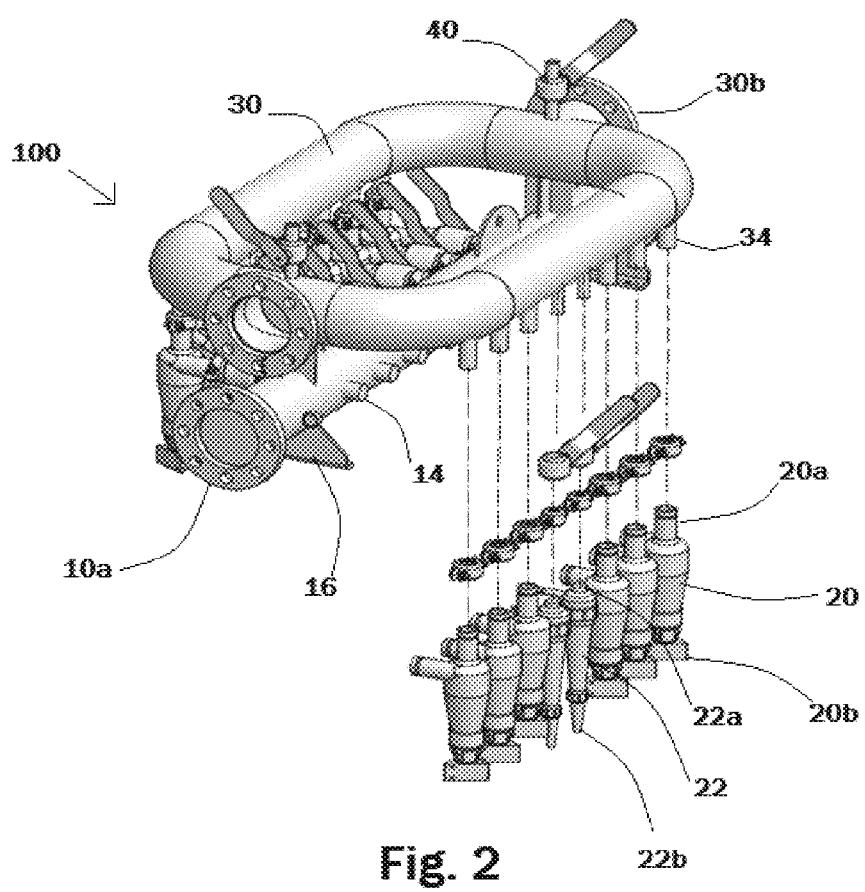
FIG. 2 is a perspective view of the desilter that shows how the hydrocyclones attach to the rectangular looping manifold.
Figure 3:
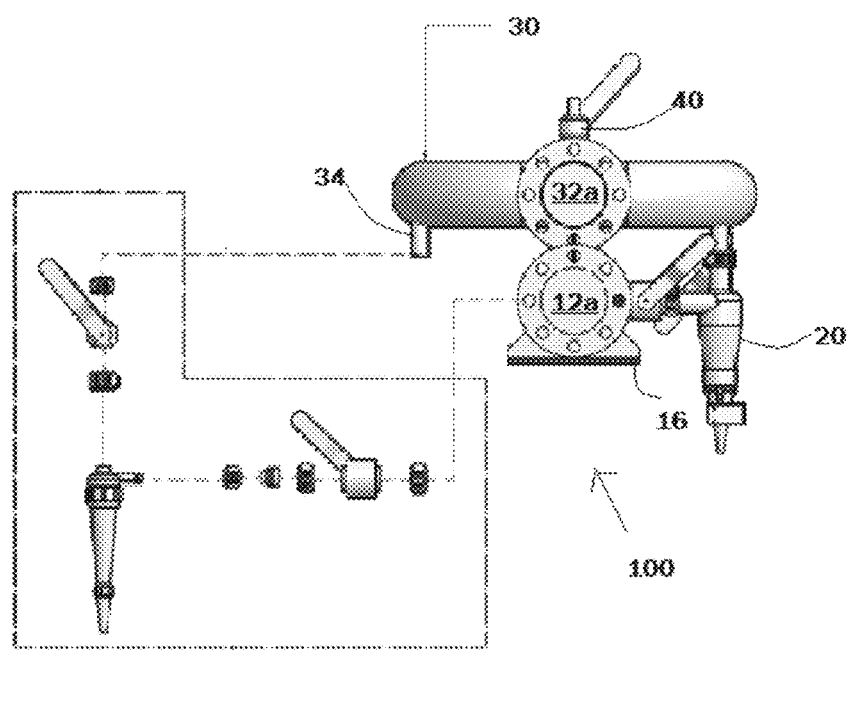
FIG. 3 is a front view of the desilter that shows how the hydrocyclones attach to the linear manifold and the rectangular looping manifold.
Figure 4:
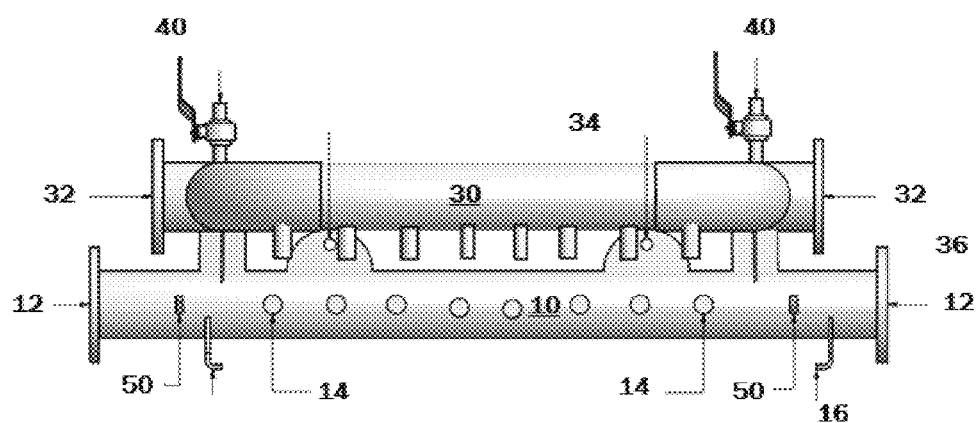
FIG. 4 is a side view that shows the supports and gauges of linear manifold and the rectangular looping manifold.

The present invention, referenced in FIGS. 1-4, is directed to an improved desilter 100 used in a mud circulating system. The desilter 100 comprises linear manifold 10 that has a front 10a and a rear side 10b, the linear manifold 10 defines an inlet 12 at the front 10a and rear side 10b, the linear manifold 10 defines a plurality of symmetrical outlets 14 that run from the inlet 12 of the linear manifold toward a capped end of the linear manifold (not shown in figures). A plurality of hydrocyclones 20, 22 that have an upper 20a, 22a and lower part 20b, 22b that are attached to the symmetrical outlets 14 of the linear manifold 10. A rectangular looping manifold 30 that has a front side 30a, a rear side 30b, an upper side 30c and a lower side 30d that is placed above the linear manifold 10 and that is secured to the linear manifold 10 via a pair of supports 36, the lower side of rectangular looping manifold 30d defines a plurality of inlet openings 36 that attach to upper part 20b, 22b of each hydrocyclone 20, 22, the front side 30a and rear side 30b of the rectangular looping manifold define an outlet 32, and the upper side of the rectangular looping manifold 30c defines a pair of air release valves 40, each air release valve 40 is positioned at either the front 30a or the rear side 30b of the rectangular looping manifold 30. And, a pair of covers (not shown in figures), one cover covers either the front 10a or rear side 10b of the linear manifold 10 and the other cover covers either the front 30a or rear outlet 30b of the rectangular looping manifold 30. The linear manifold 10 defines a front 16 and rear support (not shown in figures) that attaches to the mud circulating system.

In an embodiment of the present invention, the desilter comprises a pair of pressure gauges 50 that are attached to the linear manifold 10, each gauge 50 is attached to the linear manifold 10 at a position that is adjacent to either the front 10a or rear side 10b of the linear manifold 10.

In another embodiment of the present invention, the hydrocyclones 20, 22 are four inch 20 and two and a half inch 22 in diameter hydrocyclones. The hydrocyclones 20, 22 are attached to the symmetrical outlets 14 of the linear manifold 10 in the following order from the inlet of the linear manifold 10: three 4 inch hydrocyclones 20 are followed by two 2.5 inch hydrocyclones 22 that are then followed by three 4 inch hydrocyclones 20. The manner in which the hydrocyclones 20, 22 are attached to the linear manifold 10 is what increases the range of fine particles removed from the mud. The removal of fine particles in the range from 25 to 5 microns is now feasible with this embodiment of the present invention.

An advantage of the present invention is that it provides a desilter that increases the usefulness of mud prior to the mud being discarded as liquid waste.

Another advantage of the present invention is that it minimizes liquid waste by extending the time that mud can be used in a gas or an oil drilling operation.

Yet another advantage of the present invention is that it reduces the costs associated with the preparation and maintenance of mud used in the gas or oil drilling industries.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. An improved desilter that is used on a mud circulating system, the desilter comprises:
   a linear manifold that has a front and a rear side, the linear manifold defines an inlet at the front and rear side, the linear manifold defines a plurality of symmetrical outlets that run from the inlet of the linear manifold toward a capped end of the linear manifold;
   a plurality of hydrocyclones that have an upper and lower part that are attached to the symmetrical outlets of the linear manifold;
   a rectangular looping manifold that has a front side, a rear side, an upper side and a lower side that is placed above the linear manifold and that is secured to the linear manifold via a pair of supports, the lower side of rectangular looping manifold defines a plurality of inlet openings that attach to upper part of each hydrocyclone, the front side and rear side of the rectangular looping manifold define an outlet, and the upper side of the rectangular looping manifold defines a pair of air release valves, each air release valve is positioned at either the front or the rear side of the rectangular looping manifold; and
   a pair of covers, one cover covers either the front or rear side of the linear manifold and the other cover covers either the front or rear outlet of the rectangular looping manifold.

2. The improved desilter that is used on a mud circulating system of claim 1, the desilter comprises a pair of pressure gauges that are attached to the linear manifold, each gauge is attached to the linear manifold at a position that is adjacent to either the front or rear side of the linear manifold.

3. The improved desilter that is used on a mud circulating system of claim 2, wherein the hydrocyclones are four inch and two and a half inch in diameter hydrocyclones, the hydrocyclones are attached to the symmetrical outlets of the linear manifold in the following order from the inlet of the linear manifold: three 4 inch hydrocyclones are followed by two 2.5 inch hydrocyclones that are then followed by three 4 inch hydrocyclones.

4. The improved desilter that is used on a mud circulating system of claim 3, wherein the linear manifold defines a front and rear support that attaches to the mud circulating system.

* * * * *